US007328433B2

(12) United States Patent
Tian et al.

(10) Patent No.: US 7,328,433 B2
(45) Date of Patent: Feb. 5, 2008

(54) METHODS AND APPARATUS FOR REDUCING MEMORY LATENCY IN A SOFTWARE APPLICATION

(75) Inventors: Xinmin Tian, Union City, CA (US); Shih-wei Liao, San Jose, CA (US); Hong Wang, Fremont, CA (US); Milind Girkar, Sunnyvale, CA (US); John Shen, San Jose, CA (US); Perry Wang, San Jose, CA (US); Grant Haab, Mahomet, IL (US); Gerolf Hoflehner, Santa Clara, CA (US); Daniel Lavery, Santa Clara, CA (US); Hideki Saito, Sunnyvale, CA (US); Sanjiv Shah, Champaign, IL (US); Dongkeun Kim, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 858 days.

(21) Appl. No.: 10/677,414

(22) Filed: Oct. 2, 2003

(65) Prior Publication Data

US 2005/0086652 A1 Apr. 21, 2005

(51) Int. Cl.
*G06F 9/44* (2006.01)
(52) U.S. Cl. ............... 717/149; 717/161; 711/123; 711/126; 711/204; 712/204; 712/207
(58) Field of Classification Search ............. 717/161, 717/149; 711/118–140, 204; 712/205–208, 712/226, 233–241
See application file for complete search history.

(56) References Cited

U.S. PATENT DOCUMENTS 5,590,293 A * 12/1996 Uhler et al. ............. 712/234

| | | | |
|---|---|---|---|
| 5,809,566 A * | 9/1998 | Charney et al. | 711/213 |
| 5,835,947 A * | 11/1998 | Cherabuddi | 711/125 |
| 6,199,154 B1 * | 3/2001 | Witt | 712/205 |
| 6,223,276 B1 * | 4/2001 | Lee et al. | 712/207 |
| 6,643,766 B1 * | 11/2003 | Lesartre et al. | 712/207 |

OTHER PUBLICATIONS

Programming Itanium-Based Systems, Waiter Triebel et al, Intel Press, pp. 307-309 2001.*
Scientific Computing on Itanium-based Systems, Marius Comea et al, Intel Press, pp. 96-109, 2002.*
Itanium Architecture for Software Developers, Intel Press, Walter Triebel, pp. 12-17, 65-100, 288-308, 2000.*
M. Annavaram, J. Patel, E. Davidson. Data Prefetching by Dependence Graph Precomputation. In 28th *International Symposium on Computer Architecture*, Goteborg, Sweden, Jul. 2001.

(Continued)

*Primary Examiner*—Todd Ingberg
(74) *Attorney, Agent, or Firm*—Hanley Flight & Zimmerman, LLC

(57) ABSTRACT

Methods and apparatus for reducing memory latency in a software application are disclosed. A disclosed system uses one or more helper threads to prefetch variables for a main thread to reduce performance bottlenecks due to memory latency and/or a cache miss. A performance analysis tool is used to profile the software application's resource usage and identifies areas in the software application experiencing performance bottlenecks. Compiler-runtime instructions are generated into the software application to create and manage the helper thread. The helper thread prefetches data in the identified areas of the software application experiencing performance bottlenecks. A counting mechanism is inserted into the helper thread and a counting mechanism is inserted into the main thread to coordinate the execution of the helper thread with the main thread and to help ensure the prefetched data is not removed from the cache before the main thread is able to take advantage of the prefetched data.

34 Claims, 5 Drawing Sheets

OTHER PUBLICATIONS

M. Carlisle. Olden: Parallelizing Programs with Dynamic Data Structures on Distributed-Memory Machines, *Ph. D. Thesis*, Princeton University Department of Computer Science, Jun. 1996.

R. Chappell, J. Stark, S. Kime, S. Reinhardt, and Y. Patt. Simultaneous Subordinate Microthreading (SSMT). In *26th International Symposium on Computer Architecture*, May 1999.

J. Collins, H. Wang, D. Tullsen, C. Hughes, Y. Lee, D. Lavery, J. Shen. Speculative Precomputation: Long-range Prefetching of Delingquent Loads. In *28th International Symposium on Computer Architecture*, Goteborg, Sweden, Jul. 2001.

Intel Corporation. "Intel delivers Hyper-Threading Technology with Pentium 4 Processor 3 Ghz milestone." http://www.intel.com/pressroom/archive/release/20021114comp.htm. As printed on Jan. 12, 2003.

D. Kim and D. Yeung. Design and Evaluation of Compiler Algorithms for Pre-Exectution. In *ASPLOS-X Conference*, pp. 159-170, Oct. 2002.

S. Liao, P. Wang, H. Wang, G. Hoflehner, D. Lavery, J. Shen. "Post-Pass Binary Adapation For Software-Based Speculative Precomputation." Proceedings of the ACM SIGPLAN 2002 Conference On Programming Language Design And Implementation. 2002.

H. Wang, P. Wange, R. Weldon, S. Ettinger, H. Saito, M. Girkar, S. Liao, J. Shen. Speculative Precompuation: Exploring the Use of Multithreading for Latency. In *Intel Technology Journal* Q1, 2002. vol. 6 Issue 1.

X. Tian, A. Bik, M. Girkar, P. Grey, H. Saito, E. Su. Intel OpenMP C++/Fortran Compiler for Hyper-Threading Technology: Implementation and Performance. In Intel Technology Journal Q1, 2002. vol. 6 Issue 1.

International Search Report for International application No. PCT/US2004/032212 published with publication No. WO 2005/033926 A3, Apr. 14, 2005.

Dorai et al., *Optimizing SMT Processors for High Single-Thread Performance*, Journal of Instruction Level Paralelism 5 (2003), Apr. 2003, pp. 1-35.

Submitted herewith is a copy of a Written Opinion of the International Searching Authority for the International application No. PCT/US2004/032212.

* cited by examiner

METHODS AND APPARATUS FOR REDUCING MEMORY LATENCY IN A SOFTWARE APPLICATION

TECHNICAL FIELD

The present disclosure pertains to helper threads and, more particularly, to methods and an apparatus for reducing memory latency in a software application.

BACKGROUND

Consumers continue to demand faster computers. Multi-threading technology, such as Simultaneous Multi-Threading (SMT), is an effective way to boost throughput performance with limited impact on a processor die area. SMT increases processor throughput by executing a plurality of processing threads in parallel. However many software applications do not benefit from SMT because they are single threaded and, therefore, do not take advantage of the multithreading technology.

In addition, the gap between processor and memory speed continues to widen, with processor speed exceeding memory speed. As a result, computer performance is increasingly determined by the effectiveness of processor cache hierarchy. Prefetching, which is a process by which instructions are transferred from system memory to cache memory, is a well known and effective technique for improving the effectiveness of the cache hierarchy. However, prefetching alone may not guarantee that a software application will be able to benefit from the speed of the cache memory. In addition, some effort is needed to prevent the prefetched variable from being removed from the cache before the software application has been able to use the prefetched variable.

DETAILED DESCRIPTION

Generally, the disclosed system uses helper threads to prefetch variables and/or instructions within a main thread of a software application in order to reduce memory latency. The software application is analyzed for cache misses and long memory latency times and compiler-runtime instructions are added to the software application to create a helper thread and to manage the helper thread and the main thread. The helper thread is generated from the main thread to prefetch variables and/or instructions and caches the prefetched variables and/or instructions for the main thread to access. To prevent the cached variables and/or instructions from being removed from the cache before the main thread is able to access the cache, a counting mechanism is added to the main thread and the helper thread to coordinate execution of the main thread and the helper thread.

Figure 1:
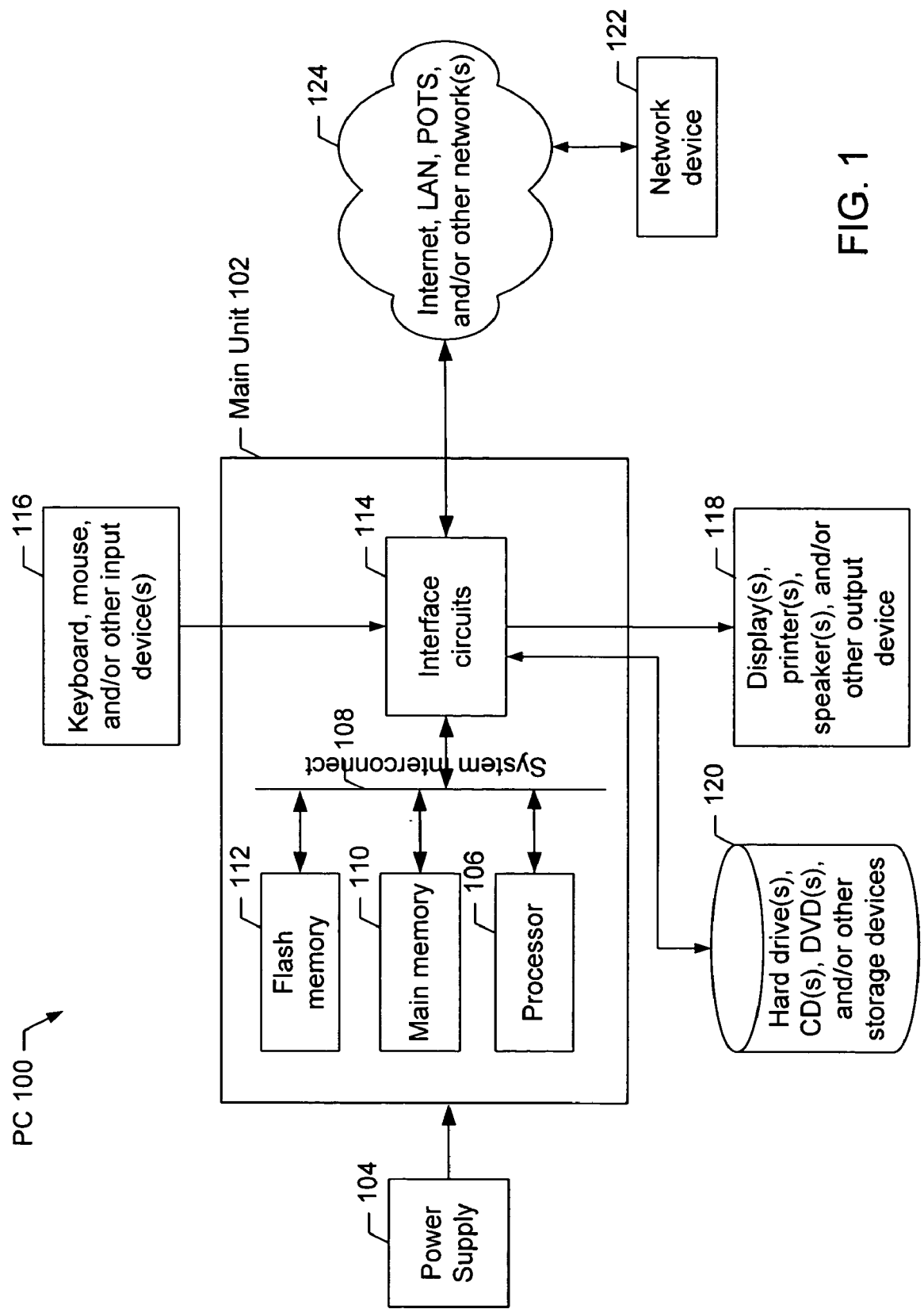
FIG. 1 is a block diagram of an example computer system illustrating an environment of use for the disclosed system.

FIG. 1 is a block diagram of an example computer system illustrating an environment of use for the disclosed system. The computer system 100 may be a personal computer (PC) or any other computing device. In the example illustrated, the computer system 100 includes a main processing unit 102 powered by a power supply 104. The main processing unit 102 may include a processor 106 electrically coupled by a system interconnect 108 to a main memory device 110, a flash memory device 112, and one or more interface circuits 114. In an example, the system interconnect 108 is an address/data bus. Of course, a person of ordinary skill in the art will readily appreciate that interconnects other than busses may be used to connect the processor 106 to the other devices 110, 112, and 114. For example, one or more dedicated lines and/or a crossbar may be used to connect the processor 106 to the other devices 110, 112, and 114.

The processor 106 may be any type of well known processor, such as a processor from the Intel Pentium® family of microprocessors, the Intel Itanium® family of microprocessors, the Intel Centrino® family of microprocessors, and/or the Intel XScale® family of microprocessors. In addition, the processor 106 may include any type of well known cache memory, such as static random access memory (SRAM). The main memory device 110 may include dynamic random access memory (DRAM) and/or any other form of random access memory. For example, the main memory device 110 may include double data rate random access memory (DDRAM). The main memory device 110 may also include non-volatile memory. In an example, the main memory device 110 stores a software program that is executed by the processor 106 in a well known manner. The flash memory device 112 may be any type of flash memory device. The flash memory device 112 may store firmware used to boot the computer system 100.

The interface circuit(s) 114 may be implemented using any type of well known interface standard, such as an Ethernet interface and/or a Universal Serial Bus (USB) interface. One or more input devices 116 may be connected to the interface circuits 114 for entering data and commands into the main processing unit 102. For example, an input device 116 may be a keyboard, mouse, touch screen, track pad, track ball, isopoint, and/or a voice recognition system.

One or more displays, printers, speakers, and/or other output devices 118 may also be connected to the main processing unit 102 via one or more of the interface circuits 114. The display 118 may be a cathode ray tube (CRT), a liquid crystal displays (LCD), or any other type of display. The display 118 may generate visual indications of data generated during operation of the main processing unit 102. The visual indications may include prompts for human operator input, calculated values, detected data, etc.

The computer system 100 may also include one or more storage devices 120. For example, the computer system 100 may include one or more hard drives, a compact disk (CD) drive, a digital versatile disk drive (DVD), and/or other computer media input/output (I/O) devices.

The computer system 100 may also exchange data with other devices 122 via a connection to a network 124. The network connection may be any type of network connection, such as an Ethernet connection, digital subscriber line (DSL), telephone line, coaxial cable, etc. The network 124 may be any type of network, such as the Internet, a telephone network, a cable network, and/or a wireless network. The network devices 122 may be any type of network devices 122. For example, the network device 122 may be a client, a server, a hard drive, etc.

The computer system 100 may be used to execute software applications. A variety of types of software applications may be used on the computer system 100 such as word processors, computer games, and/or engineering development tools. In addition, a software profiler and/or a software performance analysis may be executed by the computer system 100 to determine how well a software application is performing. The computer system 100 may also execute software applications that have been optimized for improved performance on the computer system 100.

Figure 2:
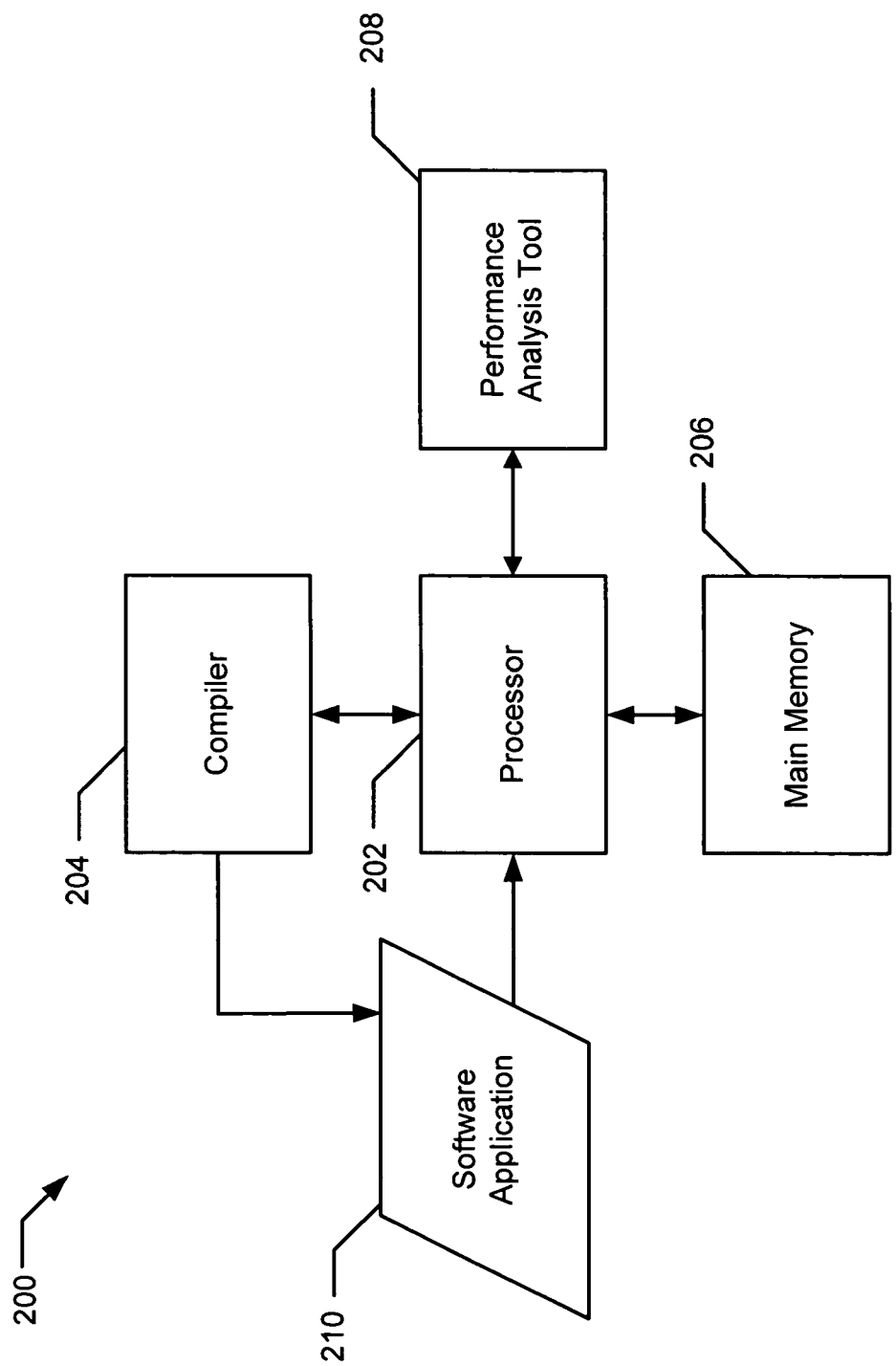
FIG. 2 is a block diagram of another example computer system illustrating an environment of use for the disclosed system.

FIG. 2 is a block diagram of another example computer system illustrating an environment of use for the disclosed system. In this example, computer system 200 includes a processor 202, a compiler 204, a main memory 206, a performance analysis tool 208 and a software application 210.

Again, the processor 202 may be any type of well known processor, such as a processor from the Intel Pentium® family of microprocessors, the Intel Itanium® family of microprocessors, the Intel Centrino® family of microprocessors, and/or the Intel XScale® family of microprocessors. The main memory device 206 may include dynamic random access memory (DRAM) and/or any other form of random access memory. The main memory device 206 also contains memory for a cache hierarchy. The cache hierarchy may consist of a single cache or may be several levels of cache with different sizes and/or access speeds. For example, the cache hierarchy may consist of three levels of on-board cache memory. A first level of cache may be the smallest cache having the fastest access time. Additional levels of cache progressively increase in size and access time.

Typically, the compiler 204 may be any type of compiler to interpret any type of programming language such as C, C++, Java, or Basic. The compiler 204 generates the software application 210 from the software application's code listing by reading the software application's code listing and generating instructions that the processor 202 and/or the computer system 200 can interpret and execute.

The performance analysis tool 208 is an instrument to provide feedback regarding the software application's runtime performance. The performance analysis tool 208 monitors the computer system's usage (e.g., processor usage, memory usage, timers, data bus, etc.) while the processor 202 and/or the computer system 200 is executing the software application 210. The performance analysis tool 208 provides feedback regarding the software application's performance bottlenecks and/or resource usage. For example, feedback may include cache hit rate, cache miss rate, processor usage, memory latency times, memory usage, and time spent in each section of the software application 210.

Figure 3:
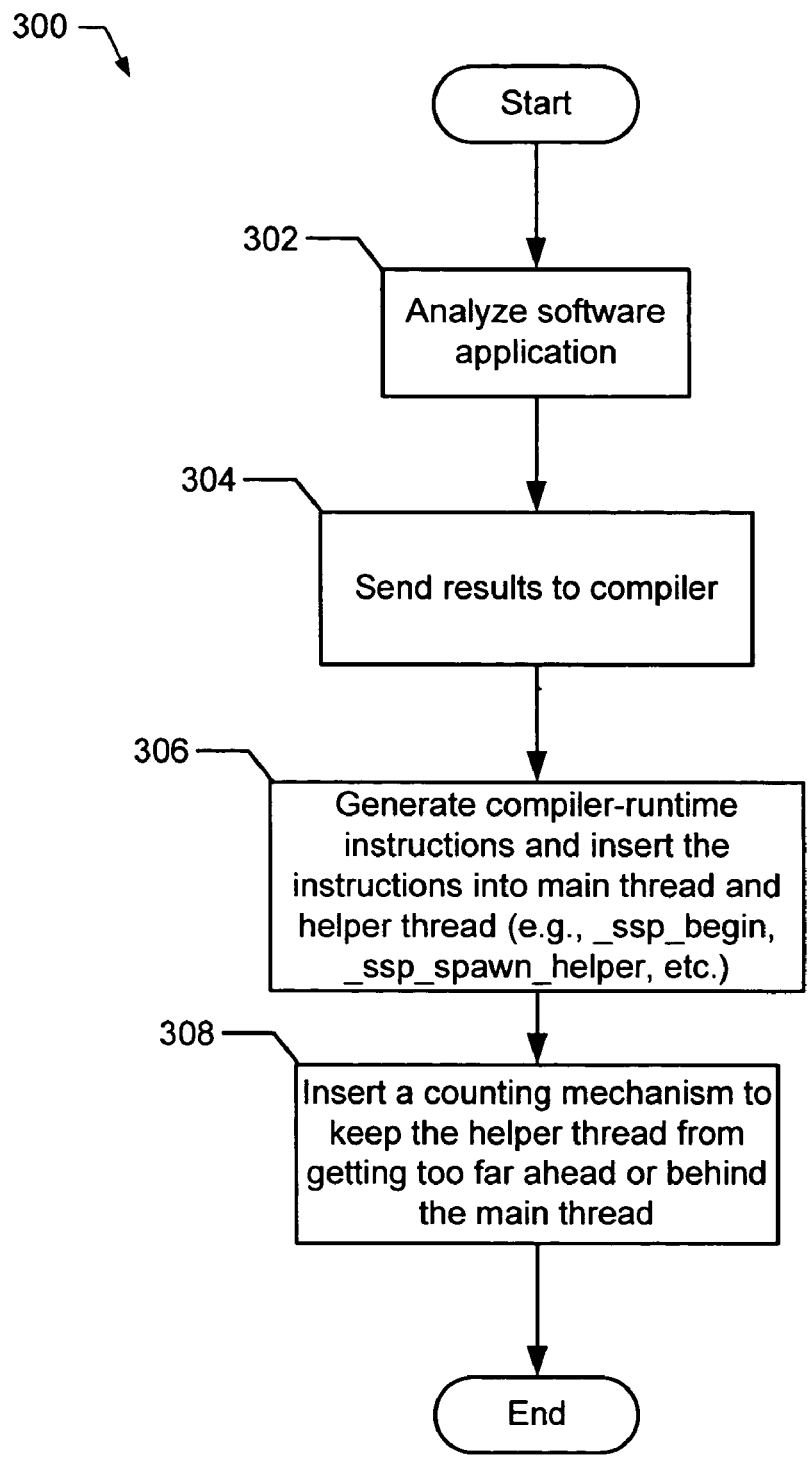
FIG. 3 is a flowchart representative of example machine readable instructions that may be executed by a device to implement an example method of reducing memory latency in a software application.

FIG. 3 is a flowchart representative of example machine readable instructions which may be executed by a device to implement an example method of reducing memory latency in a software application. Preferably, the illustrated process 300 is embodied in one or more software programs that are stored in one or more memories (e.g., flash memory 112 and/or hard disk 120) and executed by one or more processors (e.g., processor 106 and/or 202) in a well known manner. However, some or all of the blocks of the process 300 may be performed manually and/or by some other device. Although the process 300 is described with reference to the flowchart illustrated in FIG. 3, a person of ordinary skill in the art will readily appreciate that many other methods of performing the process 300 may be used. For example, the order of many of the blocks may be altered, the operation of one or more blocks may be changed, blocks may be combined, and/or blocks may be eliminated.

In general, the example process 300 uses a performance analysis tool 208 to determine areas of the software application 210 that have performance bottlenecks due to memory access times and/or cache misses. Using this performance information, the compiler 204 generates compiler-runtime instructions and inserts the instructions into the software application 210. The compiler-runtime instructions generate a helper thread to help relieve the performance bottleneck by prefetching variables, which were identified as creating a bottleneck by the performance analysis tool 208. The compiler 204 also inserts a portion of a counting mechanism in the helper thread and a portion of a counting mechanism in the main thread to prevent the helper thread's execution point from being too far ahead or too far behind the execution point of the main thread.

The example process 300 begins by analyzing the software application 210 (block 302). The performance analysis tool 208 is used to identify areas of the software application 210 that encounter performance bottlenecks due to cache misses and/or memory latency times. An example performance analysis tool 208 is the Vtune™ Performance Analyzer tool. The Vtune™ Performance Analyzer tool provides a user with information such as how much time is spent in areas of the software, relationships between software functions in the software application 210, resource usage (e.g., how much RAM the software application 210 is using or the percentage of CPU time the software application 210 is using) and information about an individual thread's performance in a large multi-threaded application.

After the performance analysis tool 208 is finished analyzing the software application 210, the profiling information is sent to the compiler 204 (block 304). The compiler 204 processes the profiling information from the performance analysis tool 208 and determines which areas of the software application 210 the compiler 204 will modify to help relieve the performance bottlenecks. In an example implementation, the compiler 204 may receive a list identifying the areas of the software application experiencing performance bottlenecks due to cache misses and/or memory latencies. The compiler 204 then determines the areas of the code with the highest cache miss rates and/or largest memory access times and modifies these areas of the software application 210.

The compiler 204 attempts to relieve the performance bottlenecks by generating compiler-runtime instructions and inserting the instructions in the main thread to create and manage the helper thread in order to prefetch variables in the areas of the software application 210 identified by the performance analysis tool 208 (block 306). One example method to implement the creation of the helper thread is to generate an instruction, _ssp_begin, and insert the instruction in the main thread. This instruction creates a thread team (e.g., a thread and the helper threads spawned by the thread), initially only consisting of the main thread. A second compiler-runtime, _ssp_spawn_helper, instruction is also generated and inserted in the main thread to spawn the helper thread from a thread pool maintained by the computer system 200. A third compiler-runtime instruction, _ssp_end, is generated in the software application 210 to terminate all helper threads associated with the main thread.

After the compiler generates the compiler-runtime instructions and inserts the instructions in the main thread to spawn the helper thread, the helper thread code (e.g., the software instructions that make up the helper thread) is generated. One example method of creating the helper thread code is to have the compiler 204 use the profiling information received from the performance analysis tool 208 and to identify the variables within the areas of the software application causing the cache misses. After the variables responsible for the cache misses are identified, the compiler generates instructions in the body of the helper thread to access the variables (e.g., assign the variable to a register) and to cache the variables.

Another example method of creating the helper thread code is to allow a software developer to create the helper thread code and use pragma statements to manage the helper thread and the main thread (e.g., spawn new threads, control execution of the main thread and/or the helper thread, etc.). A thread graph may be used to enable code reuse between the method of allowing the software developer to create the helper thread code and the method of allowing the compiler to generate the helper thread code. The thread graph is a representation of a sequence of instructions or a code region and shows the thread-spawning relationship between a thread and a helper thread. The pragma statements inserted by the user and the compiler-runtime instructions generated by the compiler will share the thread graph and allow the helper thread code generation module to be shared.

The compiler 204 also inserts a counting mechanism into the helper thread and the main thread (block 308). The counting mechanism allows the parallel execution of the helper thread and the main thread to be coordinated to prevent one thread's execution from being too far ahead or behind the other thread's execution. Relative synchronization of the main and helper threads helps to prevent a variable from being prefetched and cached by the helper thread and removed from the cache before the main thread has a chance to access the variable. Accordingly, relative synchronization of the main and helper threads reduces the chances of the main thread encountering a cache miss that the helper thread was created to prevent.

As a result of the example process 300, an optimized software application is produced which may be executed on the computer system 100. The optimized software application is optimized to take advantage of the multithreading technology and includes instructions to generate the helper thread to prefetch variables and the counting mechanism to coordinate the execution of the helper and main threads.

Figure 4:
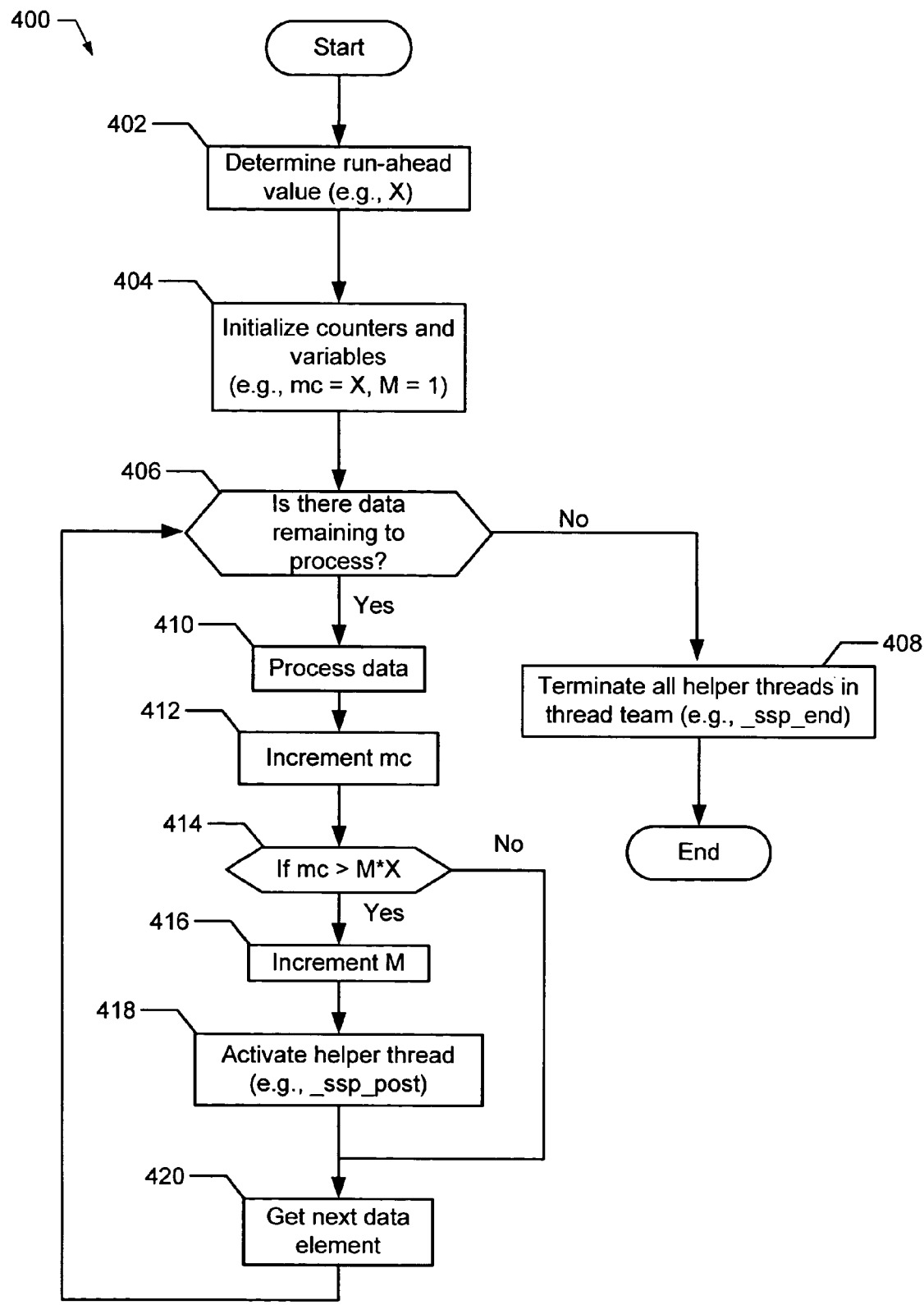
FIG. 4 is a flowchart representative of example machine readable instructions that may be executed by a device to implement an example method of managing execution of a main thread relative to a helper thread.
Figure 5:
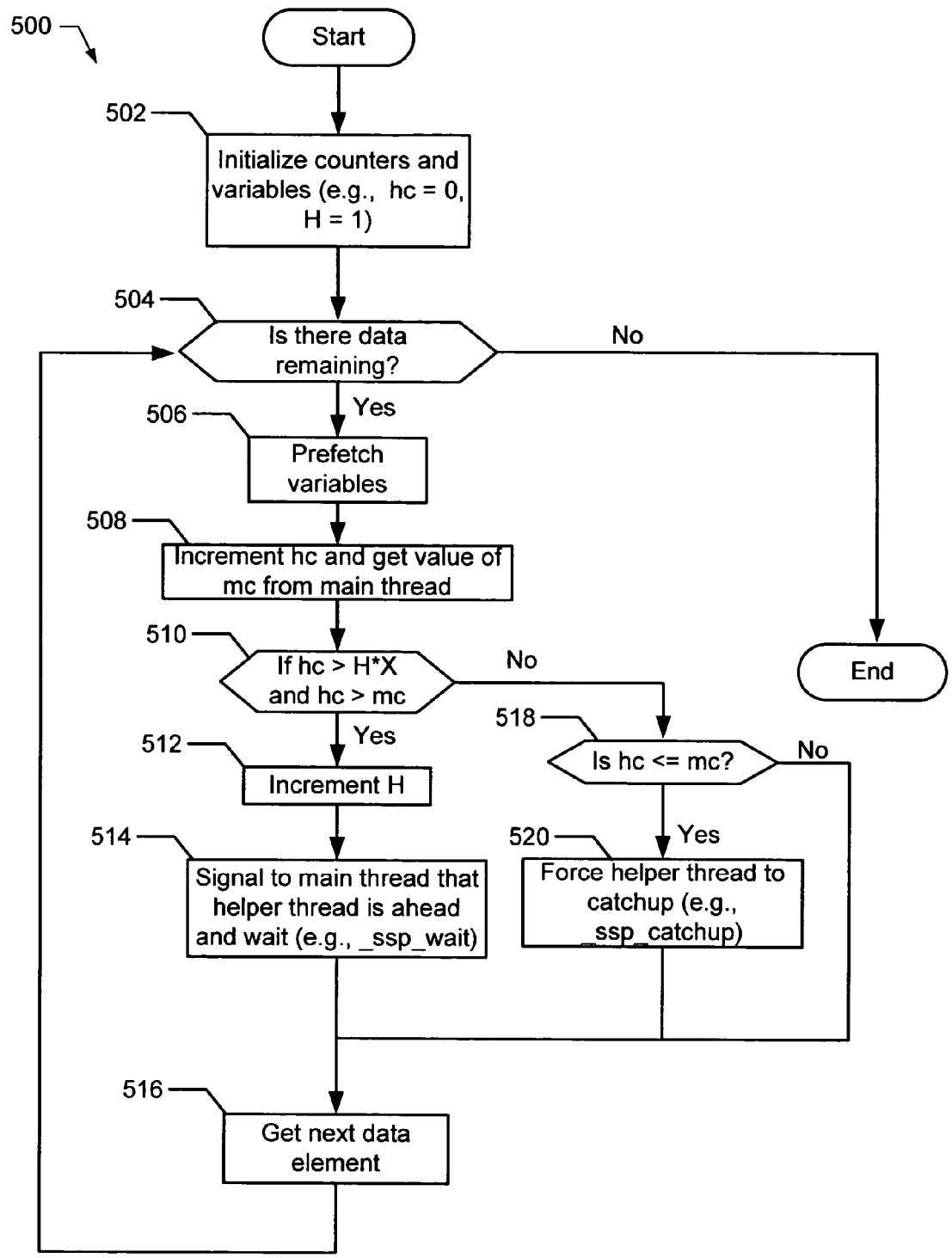
FIG. 5 is a flowchart representative of example machine readable instructions that may be executed by a device to implement an example method of managing execution of a helper thread relative to a main thread.

FIGS. 4 and 5 illustrate an example method to implement the counting mechanism in the helper thread and the main thread using software counters and compiler-runtime instructions to control the execution of the helper and main threads in response to the values of the counters. A person of ordinary skill in the art will readily appreciate that many other methods of implementing the counting mechanism may be used. For example, the number of counters may be changed or a mailbox system may be used to coordinate the execution of the helper thread and the main thread. In the example method to implement the counting mechanism, the counting mechanism includes two halves operating in parallel. The first half of the counting mechanism is used to control execution of the main thread (e.g., process 400) and is illustrated in FIG. 4. The second half of the counting mechanism is used to control the execution of the helper thread (e.g., process 500) and is illustrated in FIG. 5.

In general, the counting mechanism attempts to control the relative execution of the main thread and the helper thread. A pair of counters is used by the main thread to keep the main thread's execution point a certain distance behind the helper thread's execution point to allow a sufficient amount of time for the variable to be prefetched. A second pair of counters is used by the helper thread to keep the helper thread's execution point a predetermined distance from the main thread's execution point to allow the main thread to benefit from the prefetching.

FIG. 4 illustrates the first half of the counting mechanism 400 implemented in the main thread to control the execution of the main thread. First, a run-ahead value (e.g., X) is determined (block 402). The run-ahead value is a predefined threshold dictating how far ahead or behind in execution the main and helper threads may operate from one another. The run-ahead value may be determined empirically through analysis of the profiling information or may be set by options in the compiler 204. Two counters (e.g., mc and M) are inserted into the main thread and initialized (e.g., mc=X and M=1) (block 404).

The main thread typically includes a loop that performs some data processing (e.g., calculations, manipulates variables, sorting, etc.) involving the variables causing a performance bottleneck within the loop. The main thread checks to see if there is any remaining data to be processed (block 406). If there is no data remaining, the main thread calls a compiler-runtime instruction to terminate any helper threads associated with the main thread (e.g., _ssp_end) (block 408).

If there is data remaining (block 406), the main thread performs the data processing (block 410) and then increments the counter mc (block 412). The counter mc is compared to the counter M scaled by the run-ahead threshold (e.g., M*X) to see if the counter mc is larger than the scaled value of counter M (e.g., is mc>M*X) (block 414).

If counter mc is greater than M*X, this signifies that the main thread's execution is too far ahead of the helper thread's execution. The counter M is then incremented (block 416) and a compiler-runtime instruction is called to activate the helper thread (e.g. _ssp_post) (block 418). The main thread continues execution by retrieving the next data element (block 420) and iterating through the data processing loop (blocks 406, 408, 410, 412, 414, 416, 418, and 420).

If counter mc is less than or equal to M*X, this signifies that the main thread's execution is within the predefined run-ahead threshold. The main thread continues by retrieving the next data element (block 420) and continues iterating through the data processing loop (blocks 406, 408, 410, 412, 414, 416, 418, and 420).

FIG. 5 illustrates the second half of the counting mechanism 500 implemented in the helper thread to control the execution of the helper thread. Upon commencement of the second half of the counting mechanism 500, two counters (hc and H) are initialized (hc=0 and H=1) (block 502), and then the helper thread checks to see if there is data remaing to be prefetched (block 504). If there is no data remaining, the helper thread ends.

If data remains to be prefetched (block 504), the helper thread will prefetch the data (e.g., some instruction that reads the variable and puts the value of the variable into the cache) is executed (block 506). The value of counter hc is incremented and the value of the main thread's counter mc is retrieved (block 508).

The counter hc is compared to counter H scaled by the run-ahead threshold X (e.g., is hc>H*X), and the counter hc is compared to the value of counter mc (e.g., is hc>mc) (block 510). If both conditions are satisfied, the helper thread is too far ahead of the main thread. The helper thread continues by incrementing the counter H (block 512) and executes a compiler-runtime instruction to wait and allow the main thread to catch up (e.g., _ssp_wait) (block 514). The helper thread then continues to retrieve the next data element to prefetch (block 516) and continues iterating through the loop.

If both conditions (hc>H*X and hc>mc) are not satisfied (block 510), the helper thread compares counter hc to counter mc (e.g., is hc<=mc) (block 518). If counter hc is less than counter mc, the helper thread is behind the main thread. The helper thread will then execute a compiler-runtime instruction to allow the helper thread to catch up (e.g., _ssp_catchup) (block 520). One method to implement the catch up instruction is to have the catch up instruction set the values of counter hc, counter H, and the data being prefetched to be equal to the values of the counter mc, counter M and the data being processed in the main thread, respectively. By modifying the counter values as such, the helper thread skips the prefetching of variables already fetched by the main thread. The next data element is then retrieved (block 516), and the helper thread continues iterating through the loop (block 504, 506, 508, 510, 512, 514, and 516).

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of reducing memory latency in a software application, the method comprising:
    analyzing the software application and determining a first area of software instructions that encounters a cache miss;
    generating a helper thread;
    generating a first set of compiler-runtime instructions and inserting the first set of compiler-runtime instructions in a main thread;
    generating a second set of compiler-runtime instructions and inserting the second set of compiler-runtime instructions in the helper thread; and
    inserting a counting mechanism in the main thread and the helper thread, the counting mechanism being structured to coordinate relative execution points of the main thread and the helper thread.

2. A method as defined in claim 1, further comprising analyzing the software application and determining a second area of software instructions which encounters a memory load latency.

3. A method as defined in claim 2, wherein the first area of software instructions is different than the second area of software instructions.

4. A method as defined in claim 2, wherein the first area of software instructions comprises the second area of software instructions.

5. A method as defined in claim 2, wherein analyzing the software application comprises:
    measuring cache miss rates associated with the software application using a performance analysis tool;
    measuring memory load latencies associated with the software application using the performance analysis tool;
    reporting the first area of software instructions which encounters the cache miss to a compiler; and
    reporting the second area of software instructions which encounters the memory load latency.

6. A method as defined in claim 1, wherein generating a helper thread includes generating a thread graph.

7. A method as defined in claim 6, wherein the thread graph presents a data structure that represents a relationship between the main thread and the helper thread.

8. A method as defined in claim 6, wherein the thread graph facilitates code reuse.

9. A method as defined in claim 1, wherein at a least part of the first set of compiler-runtime instructions comprises at least a part of the second set of compiler-runtime instructions.

10. A method as defined in claim 1, wherein the first set of compiler-runtime instructions inserted in the main thread comprises instructions to spawn the helper thread, terminate the helper thread, and coordinate execution of the helper thread and the main thread.

11. A method as defined in claim 1, wherein the second set of compiler-runtime instructions inserted in the helper thread comprises instructions to coordinate execution of the helper thread and the main thread.

12. A method as defined in claim 1, wherein the counting mechanism comprises a software counter.

13. A method as defined in claim 12, wherein at least one of the first set of compiler-runtime instructions and the second set of compiler-runtime instructions include instructions to control execution rates of the helper thread based on a value associated with the software counter.

14. A method as defined in claim 12, wherein at least one of the first set of compiler-runtime instructions and the second set of compiler-runtime instructions include instructions to control execution rates of the main thread based on a value associated with the software counter.

15. A method as defined in claim 14, wherein the compiler-runtime instructions to control execution rates comprises a delay instruction, a catch up instruction and an instruction to force execution.

16. A system to reduce memory latency, the system comprising:
    a processor;
    a memory operatively coupled to the processor:
    the memory storing a software tool structured to identify a code region in an application program that suffers from a data cache miss;
    a compiler operatively coupled to the software tool, the compiler being structured to receive information from the software tool and to generate a helper thread;
    a set of compiler-runtime instructions to be generated and inserted in the application program to manage the helper thread and to manage a main thread; and
    a counting mechanism for insertion in the main thread and the helper thread to facilitate coordination of execution points associated with the helper thread and the main thread.

17. A system as defined in claim 16, wherein the software tool comprises a VTune™ Performance Anaylyzer.

18. A system as defined in claim 16, wherein the information the compiler receives from the software tool comprises data cache miss rates associated with the identified code region.

19. A system as defined in claim 16, wherein the information the compiler receives from the software tool comprises memory load latency times associated with the identified code region.

20. A system as defined in claim 16, wherein the helper thread is structured to prefetch variables contained in the identified code region.

21. A system as defined in claim 16, wherein the set of compiler-runtime instructions comprises instructions to create the helper thread, terminate the helper thread, delay execution of the helper thread, and activate the helper thread.

22. A system as defined in claim 16, wherein the set of compiler-runtime instructions comprises instructions to coordinate execution of the helper thread and the main thread.

23. A machine readable medium as defined in claim 22, wherein the stored instructions are structured to cause the machine to identify the code region based on cache miss rates.

24. A machine readable medium as defined in claim 22, wherein the stored instructions are structured to cause the machine to identify the code region based on memory load latencies.

25. A machine readable medium as defined in claim 22, wherein the stored instructions are structured to cause the machine to generate the helper thread to prefetch instructions within the identified code region.

26. A machine readable medium as defined in claim 22, wherein the stored instructions are structured to cause the machine to generate compiler-runtime instructions to spawn the helper thread, terminate the helper thread, coordinate execution of the helper thread and the main thread.

27. A machine readable medium as defined in claim 22, wherein the stored instructions are structured to cause the machine to manage the execution of the main thread and the helper thread by inserting a first portion of a counting mechanism in the main thread and a second portion of a counting mechanism in the helper thread.

28. A machine readable medium storing instructions to cause a machine to:
analyze a software application including a main thread;
identify a code region in the software application;
generate a helper thread;
generate and insert a first set of compiler-runtime instructions in the main thread to manage the helper thread and the main thread;
generate and insert a second set of compiler-runtime instructions in the helper thread to manage the helper thread and the main thread; and
manage execution points of the helper thread and the main thread.

29. An apparatus to reduce memory latency, the apparatus comprising:
a software tool structured to identify a code region in an application program that suffers from a data cache miss;
a compiler operatively coupled to the software tool, the compiler being structured to receive information from the software tool and to generate a helper thread;
a set of compiler-runtime instructions to be generated and inserted in the application program to manage the helper thread and to manage a main thread; and
a counting mechanism for insertion in the main thread and the helper thread to facilitate coordination of execution points associated with the helper thread and the main thread.

30. An apparatus as defined in claim 29, wherein the information the compiler receives from the software tool comprises data cache miss rates associated with the identified code region.

31. An apparatus as defined in claim 29, wherein the information the compiler receives from the software tool comprises memory load latency times associated with the identified code region.

32. An apparatus as defined in claim 29, wherein the helper thread is structured to prefetch variables contained in the identified code region.

33. An apparatus as defined in claim 29, wherein the set of compiler-runtime instructions comprises instructions to create the helper thread, terminate the helper thread, delay execution of the helper thread, and activate the helper thread.

34. An apparatus as defined in claim 29, wherein the set of compiler-runtime instructions comprises instructions to coordinate execution of the helper thread and the main thread.

* * * * *